United States Patent [19]

Fulkerson et al.

[11] Patent Number: 4,695,721
[45] Date of Patent: Sep. 22, 1987

[54] SURFACE TEXTURE RECOGNITION USING MULTI-DIRECTIONAL SCANNING

[75] Inventors: Emmet M. Fulkerson, Cincinnati; Ralph M. Somers, West Chester, both of Ohio; Diana R. Compton, Bloomington, Ind.

[73] Assignee: General Electric Company, Cincinnati, Ohio

[21] Appl. No.: 813,360

[22] Filed: Dec. 26, 1985

[51] Int. Cl.[4] .............................................. G06K 9/30
[52] U.S. Cl. .................................... 250/234; 250/236; 382/60
[58] Field of Search ............... 250/234, 235, 236, 202; 350/6.2, 6.5, 6.6; 382/4, 60, 62, 66

[56] References Cited

U.S. PATENT DOCUMENTS

| | | | |
|---|---|---|---|
| 3,396,276 | 8/1968 | Hardin et al. | 382/60 |
| 3,483,511 | 12/1969 | Rabinow | 250/235 |
| 3,668,636 | 6/1972 | Blucher | 382/60 |
| 4,032,888 | 6/1977 | Broyles | 382/66 |

Primary Examiner—David C. Nelms
Assistant Examiner—S. Allen
Attorney, Agent, or Firm—Derek P. Lawrence

[57] ABSTRACT

In the invention, a light beam is scanned along a surface bearing data, such as a serial number. Reflected light is measured and processed for character recognition. The invention wobbles or dithers the light beam during the scan, and takes reflectivity measurements several times within a region on the surface, the region being called a pixel. This procedure enhances the reflectivity signature of edges, thus improving the ability to recognize characters.

6 Claims, 8 Drawing Figures

SURFACE TEXTURE RECOGNITION USING MULTI-DIRECTIONAL SCANNING

The invention relates to optical character recognition and, more specifically, to a projector which exaggerates changes in surface reflectivity or texture.

BACKGROUND OF THE INVENTION

It is frequently desirable to read, by machine, a serial number present on an article. The serial number may be two-dimensional and applied by standard printing techniques, or may be three-dimensional. In the latter case, the serial number may be engraved, embossed, stamped, machined, laser-etched, or otherwise applied. In many of these latter cases, subsequent handling and processing of the article can damage the serial number. For example, a gas turbine engine blade can be laser-etched with a serial number. Subsequently, the blade can be shot-peened to reduce surface stresses. The shot-peening has an unwanted side effect of distorting the edges of the serial number, making the number difficult to read, especially when using optical character recognition (OCR) equipment.

OBJECTS OF THE INVENTION

It is an object of the present invention to provide new and improved optical character recognition equipment.

It is a further object of the present invention to provide OCR equipment which reduces the effect of irregularities in three-dimensional characters to be read.

It is a further object of the present invention to provide OCR equipment which has enhanced response to changes in contrast of the characters read.

SUMMARY OF THE INVENTION

In one form of the invention, a light beam is scanned along a surface bearing data, such as a serial number. Reflected light is measured and processed for character recognition. The invention wobbles or dithers the light beam during the scan, and takes reflectivity measurements several times within a region on the surface, the region being called a pixel. This procedure enhances the reflectivity signature of edges, thus improving the ability to recognize characters.

DETAILED DESCRIPTION OF THE INVENTION

Figure 1:
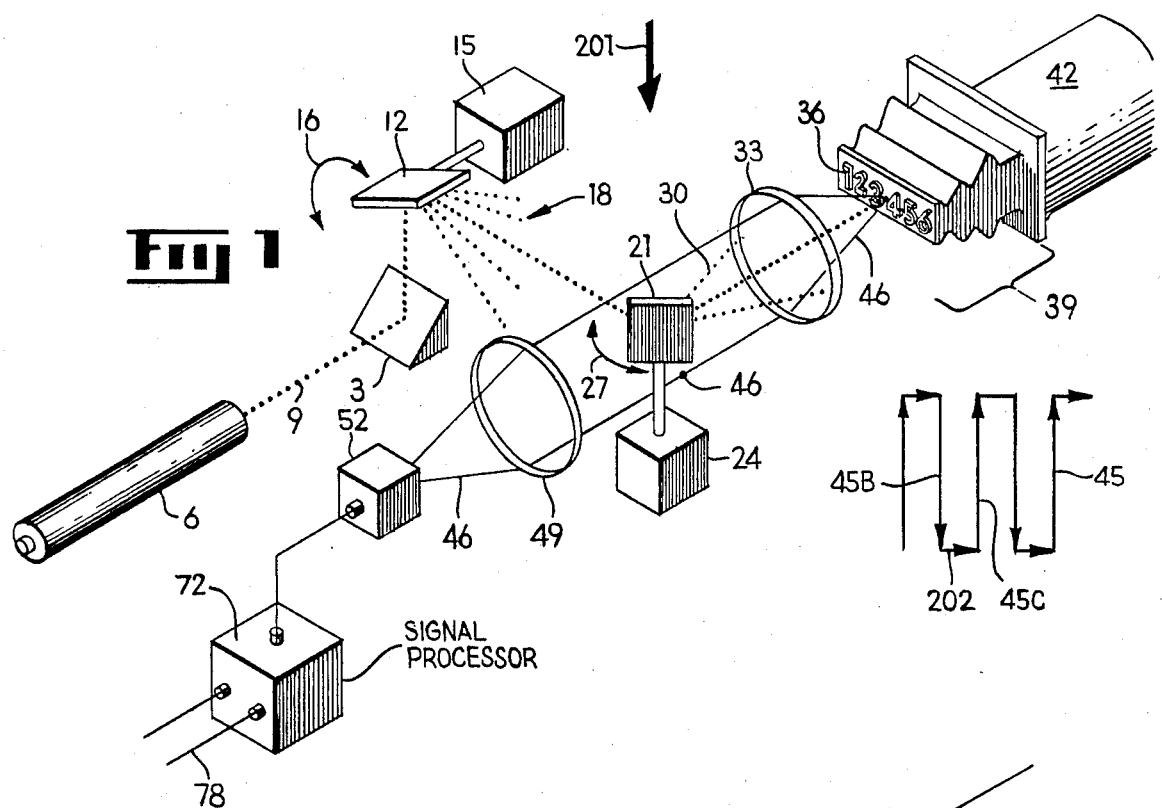
FIG. 1 illustrates one form of the invention.

FIG. 1 illustrates one form of the present invention. With the exception of scan/dither mirror 3, the components in the Figure illustrate a generalized OCR detection system.

A light source such as laser 6 projects a light beam 9 to a vertical scan mirror 12 which is driven by a vertical scan galvanometer 15. The vertical scan mirror 12 rotates as shown by arrows 16 and thus sweeps the light beam 9 into a vertical fan 18. The fan 18 is shown exaggerated for purposes of illustration. The fan 18 is received by a horizontal scan mirror 21 driven by a horizontal scan galvanometer 24. The horizontal scan mirror 21 rotates as shown by arrows 27 and thus produces a horizontal fan 30. The horizontal fan 30 is projected by a projection lens 33 onto the serial number 36 to be read. In this case, the serial number 36 is shown on the dovetail 39 of a gas turbine engine blade 42.

The combined effects of the vertical and horizontal scanning allow the laser beam 9 to be scanned in a raster pattern shown as 45. Light 46 reflected by the serial number 36 is collected by the projection lens 33, transmitted to an imaging lens 49, and focused onto a photodetector 52. The photodetector 52 continually produces a voltage signal indicative of the instantaneous intensity of the light falling upon it: the brighter the light, the larger the signal.

A signal processor 72, connected to the output of the photodetector, processes the voltage signal and produces a serial data output on lines 78.

Figure 2:
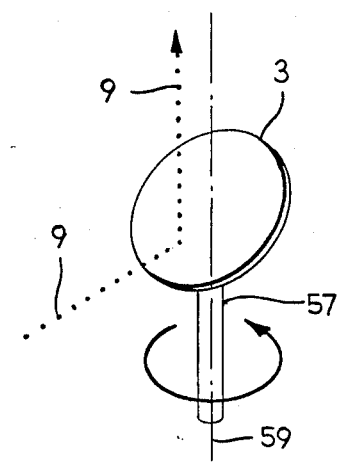
FIG. 2 illustrates a mirror 3, also shown in FIG. 1, rotating on a shaft in order to produce dither in the laser beam 9.

The dither mirror 3 is interposed in the path of the laser beam 9. The dither mirror can be a mirror 3, as shown in FIG. 2, fastened to a rotating shaft 57. The rotation causes the light beam 9 in FIG. 1 to follow the pattern 62 shown in box 65A in FIG. 3. It will be explained later that box 65A represents a pixel. After one or more traces of pattern 62, the vertical scan mirror 12 in FIG. 1 advances the laser beam to box 65B and the dither mirror 3 repeats the pattern 62. In a sense, the dither mirror 3 introduces a scan within a scan. The collection of boxes 65A–D (i.e., pixels) is an enlargement of the scan 45A at the upper left part of FIG. 3.

When the photodetector signal is displayed on an oscilloscope during the scanning just described, a trace resembling trace 81 is obtained. Trace 81 is highly simplified. Regions 89A–D in trace 81 can correspond to regions (pixels) 65A–D in scan 45A. The discontinuities occurring during scan portion 74, which occur during the jump by the laser beam 30 from one pixel to the next, are not shown on the trace 81 for simplicity. If trace 81 is viewed as a carrier wave, then the dithering introduces an amplitude modulation, so to speak. The modulated carrier wave is processed as follows.

A BANDPASS FILTER, known in the art, having a pass frequency band of 100 to 3K Hz, extracts the envelope 87 of the trace 81, and also removes any existing dc component 88, which component can result from localized reflection variations on the surface.

A RECTIFIER, known in the art, rectifies the envelope 87 into rectified envelope 87A. A PEAK FOLLOWER, known in the art, takes sections of the envelope, such as section 94, and gives the section a value, such as value 97. The PEAK FOLLOWER gives the section the highest value within the section, but other values indicative of the section's value can be used. The value is, in this case, a voltage. The section 94 thus becomes a pixel, having a voltage 97.

A LEVEL COMPARATOR, known in the art, compares each pixel value, such as 97, with a reference 99, and ascribes to each pixel a value of ONE or ZERO, depending upon whether the value 97 is above or below the reference 99. In this manner, information is obtained about the character scanned. For example, ZERO's 100 correspond to the cross bars 101 on the "2" scanned.

All operations between PHOTODETECTOR AND LEVEL COMPARATOR are analog rather than digital.

One important aspect of the invention includes the use of dither plus the BANDPASS FILTER, as will now be explained with reference to FIG. 7.

Figure 7:
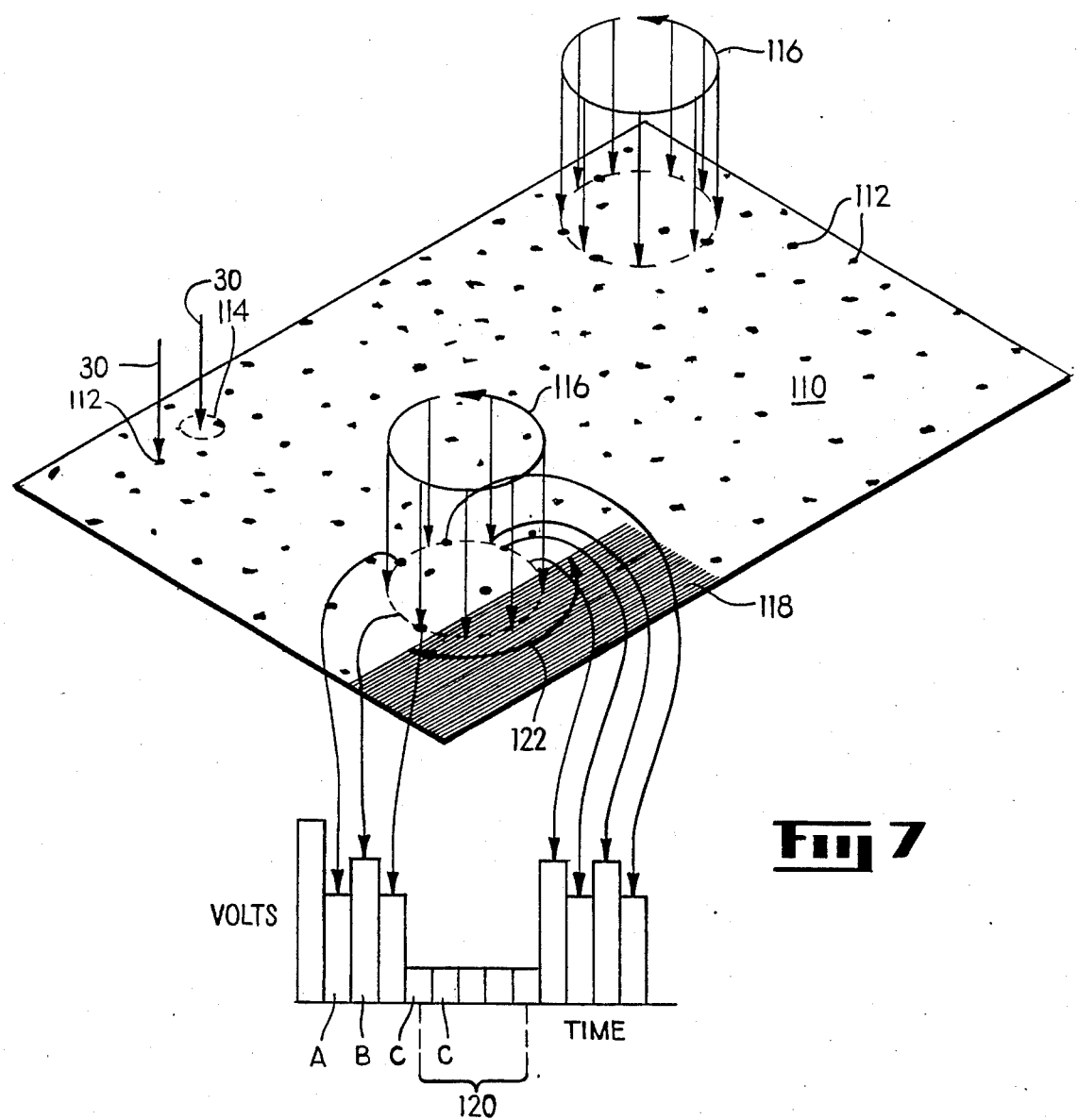

FIG. 7 shows a surface to be scanned, such as a sheet of paper 110. Spots 112 represent minute irregularities present on the surface, but ordinarily unnoticed by the naked eye. The spots give a photodetector signal of a given size (a "spot signal") in response to laser beam 30, such as signal A at the right of the Figure. When the laser beam 30 strikes off a spot, on a smooth region 114, a different, larger photodetector signal is obtained, such as signal B (a "background signal").

Figure 7A:
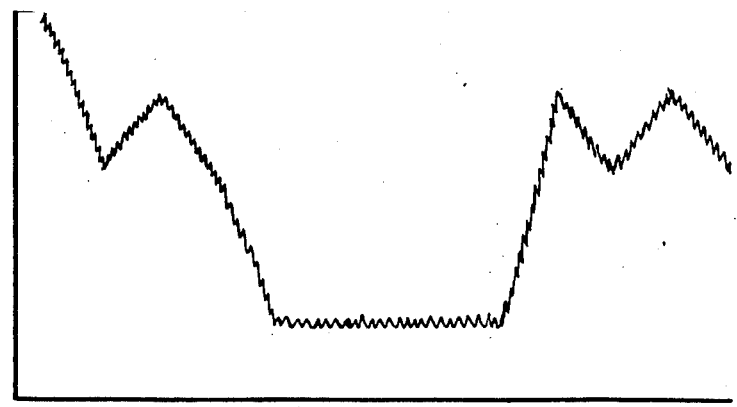

Dithering of the laser beam 30, as by rotating it in a circle in order to trace the circular pattern 116, causes the spot and background signals A and B to repeat at a high frequency. For example, with a rotation about circle 116 at a rate of 5K rps, and with ten spots 112 encountered in one rotation, then a spot frequency signal A will occur at approximately 50K times per second. The background signal B should have a similar frequency. The signals A-B, and C in FIG. 7 have been shown as discrete signals for ease of explanation. However, in fact, the actual signal is a continuous, analog signal resembling that in FIG. 7A.

Figure 3:
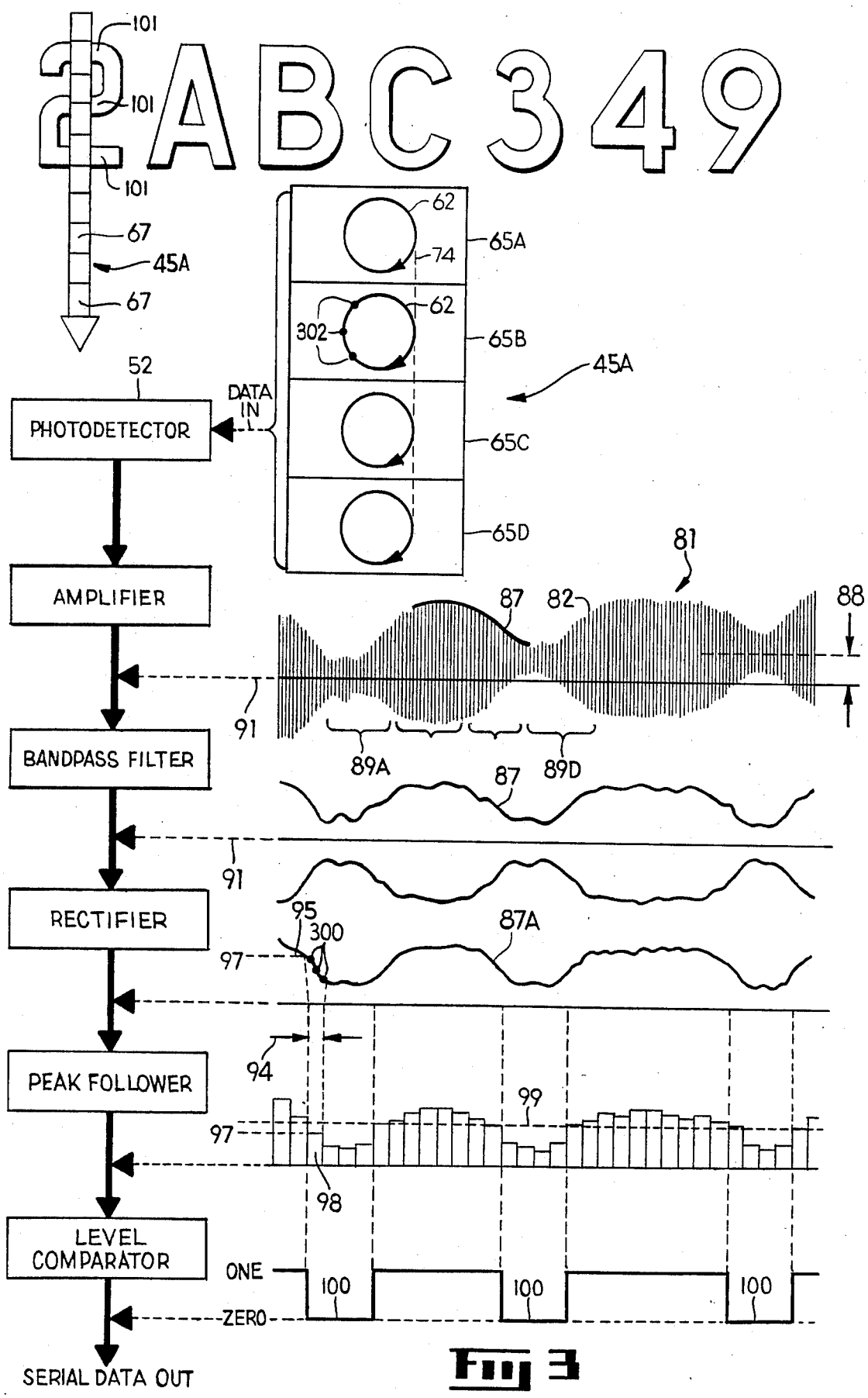
FIG. 3 illustrates a sequence of data processing steps undertaken by the invention.

The sequence of spot and background signals make up what will be called a carrier in wave 81 in FIG. 3. Then, when the circular trace 116 crosses a dark area 118, which indicates part of a character such as the "2" in FIG. 3, a third type of signal is obtained, signal C (a "data" signal) in FIG. 8. Data signal C occurs over a longer time interval 120 than signals A and because signal C corresponds to a longer part 122 of the trace 116. The data signal C tends to be significantly lower in amplitude than signals A and B.

It is the data signal C which introduces the modulation of the carrier wave 81 in FIG. 3 and is processed to produce the ZERO's in the example above.

The BANDPASS FILTER is given a passband which blocks out the spot and background signals A and B, while passing the data signals C. In the example above, with a rotation of mirror 3 at 5K rps, a pass frequency of 100 to 3000 Hz is used.

An invention has been described wherein a light beam is scanned in a raster pattern on an object. While scanning, the light beam is dithered within the scan. If the scan is viewed as a swath, the light follows a path within the swath. Light which is reflected by the object is sampled by a photodetector. Sections of the time-changing photodetector signals are processed, each signal being taken to represent a pixel, and each section is processed, as by peak selection, in order to derive a number representative of the section. Each number represents the intensity of each pixel. The pixel intensities can be used by character recognition equipment, known in the art, to recognize data contained on the object.

Figure 4:
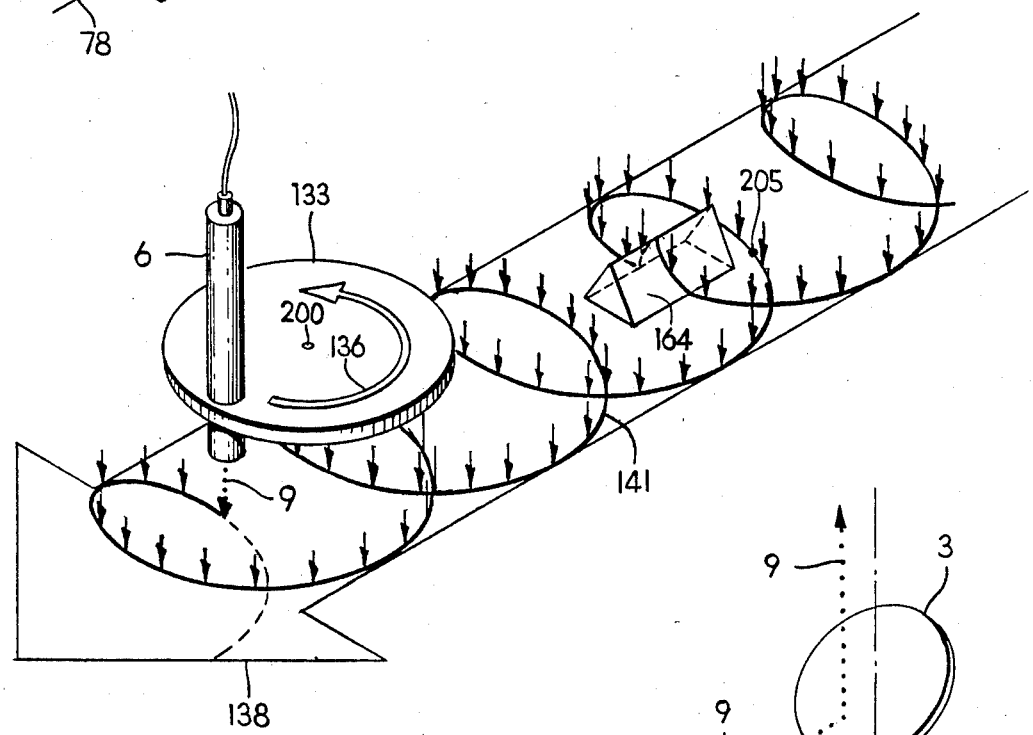
FIG. 4 illustrates another type of dithering which the invention may use.

The scan path can be described in an alternate form as shown in FIG. 4. In effect, a tiny laser 6 is supported by a disc 133 which (a) rotates as shown by arrow 136 and (b) translates as shown by arrow 138. The larger arrow 138 represents the scan 45A in FIG. 3. The path 141 traced by the laser beam 6 is a trochoid, as will now be explained.

Figure 5:
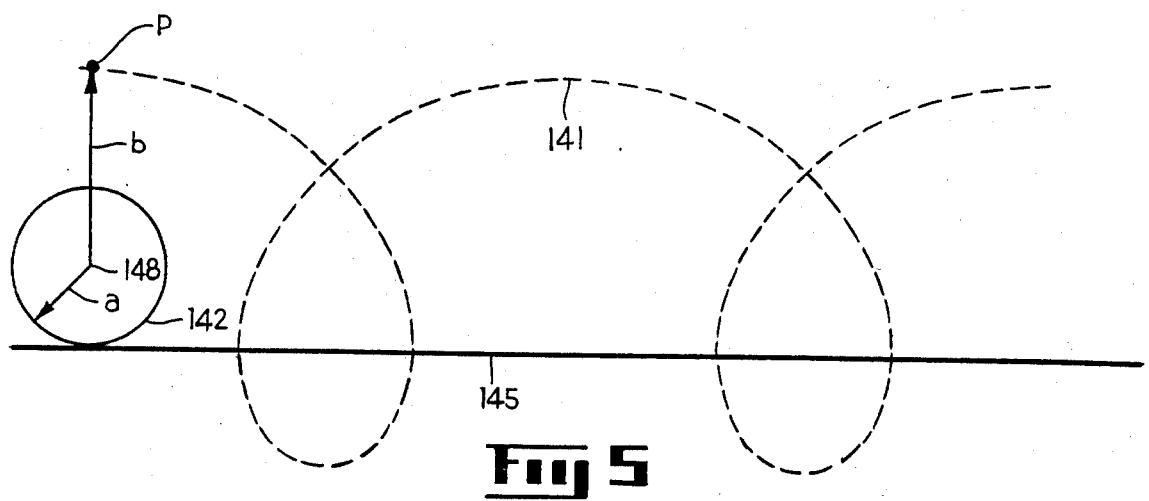
FIGS. 5-7 illustrate the trochoidal nature of the path induced by the dither.

A trochoid is a path 141 traced by a point P in FIG. 5 on a rolling circle 142 of radius a, which rolls along flat surface 145. The point P is on a radius, and at distance b from the center 148. If distance b is greater than distance a, the trochoid is termed "curtate" and if distance b is less than a, it is termed "prolate." If b equals a, then the trochoid is a special curve, a cycloid.

Figure 6:
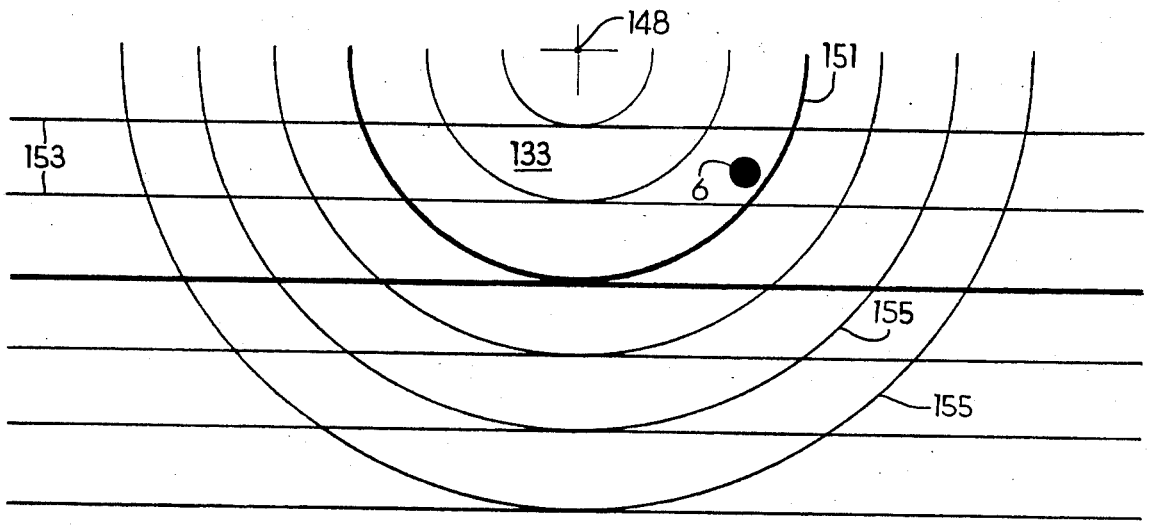

Proof that path 141 in FIGS. 4 and 5 is a trochoid is shown in FIG. 6. The center 148 of disc 133 in FIG. 4 is shown by point 148 in FIG. 6. The perimeter of the disc 133 is shown by heavy line 151. The laser 6 is shown as spot 6. Imaginary lines 153 are parallel to the direction of travel indicated by arrow 138 in FIG. 4. Irrespective of the relative speeds of rotation of the disc 133 as compared with the speed of translation, some imaginary circle 155 will roll without slipping along some imaginary line 152, thus qualifying the motion of laser 6 as trochoidal.

The previous discussion has considered rotation of the mirror 3 in FIG. 2 in order to produce dither. However, rotation is not considered necessary, but vibration should suffice. Vibration would induce the necessary scan-within-a-scan shown by lines 141 in FIG. 4.

The preceding discussion has been made in the context of reading three-dimensional data. The Inventors have found that the dither of mirror 3 in FIG. 1 enhances edges or discontinuities, such as wedge 164 in FIG. 4. The Inventors have found that the array of pixel signals 98 in FIG. 3, when taken using the dither, is markedly different from the pixel array obtained without dither, when the region scanned contains a geometric irregularity, such as the wedge 164 in FIG. 4.

The invention can be viewed as rotating the laser 6 about point 200 as shown in FIG. 4. Then, while continuing the rotation, the laser is translated, as by moving point 200 in the direction of arrow 138.

The invention can also be viewed as scanning the light beam 9 in FIG. 1 up and down while spinning the light beam 9 in a circle about axis 59 in FIG. 2. The direction of arrow 201 in FIG. 1 could be "down," and the spinning could be induced by the rotation of the disc 133 in FIG. 4. This motion would generate one scan 45B of raster 45 in FIG. 1. Moving the light beam left or right (a rightward motion is described by the raster segment 202) then allows the up-down motion to be repeated, but along a different scan, scan 45C in this example.

Several points should be noted. One: up, down, left, and right are arbitrary, and a result of the definition of a coordinate system defined on the object scanned. By convention, up/down is generally perpendicular to left/right. Two, the circular motion of the disc 133 in FIG. 4 can be viewed as introducing a left/right motion during the downward (i.e., following arrow 138) scan of the disc 133. This is so because circular motion in an x-y plane can be broken into x- and y- components. The laser at point 205 is moving rightward (and downward). Thus, the notion of left/right motion during a downward scan covers the idea of a zig-zag motion during the downward scan, as well as circular motion.

Three, the invention can be viewed as generating a pattern on the surface. For example, one that contained within the box 65A in scan 45A in FIG. 3. The invention moves the patterns from place to place; for example, from rectangle 65C to rectangle 65D in FIG. 3. The invention also divides the pattern up into subunits, such as the subunit represented by time interval 120 in FIG. 7, and generates an intensity signal for each subunit. The invention then groups the intensity signals which correspond to one pattern location and derives a signal (a pixel signal 98 in FIG. 3) which is indicative of the group. In the preferred embodiment, the peak signal of the group is used.

The preceding discussion has considered the photodetector signal as a continuous, time-varying signal shown as the modulated waveform 81 shown in FIG. 3. However, the Inventors see it possible to view the waveform as a sequence of discrete intensity signals, such as signals 300 on the envelope near the RECTIFIER. When so viewed, the signals represent a sequential group of intensity signals created perhaps as points 302 on the dither 45A. The PEAK FOLLOWER ascribes a value to the group of the intensity signals, the group becoming the pixel 98 and the value for the pixel becoming 97.

The preceding discussion has described rotation of the scanning mirror 3 in FIG. 2. However, this was for ease of explanation. In the preferred embodiment, the mirror 3 is rotated about an x- and y- axis at sinusoidal rates which are 90 degrees apart, thus given a circular motion equivalent to that shown in FIG. 2. If one uses piezoelectric crystals to induce the rotation, then extremely high rotational speeds can be obtained, in excess of 10000 rps.

The discussion of stepwise scanning of the vertical scan mirror 12 did not consider the inertia of the mirror 12. If a step voltage is applied to the galvanometer 15, ordinarily, a stepwise rotation of the mirror 12 will be obtained. However, as the stepping speed increases, the inertia of the mirror will cause it to overshoot, oscillate, and then come to rest. Thus, the actual motion of the mirror 12 will be a hybrid between the stepwise scanning shown in FIG. 3 and that shown in FIG. 4.

The term "carrier frequency" has been used. The usage is quite loose, and was done for purposes of explanation, as the waveform 81 in FIG. 3 does resemble a carrier wave. However, as explained with reference to FIG. 7, the carrier is actually a dc signal produced by the photodetector, but changing at a rate determined by the frequency of encounters with surface irregularities. Thus, the carrier rate is not known in advance.

Numerous modifications and substitutions can be undertaken without departing from the true spirit and scope of the invention. For example, use in connection with a three-dimensional serial number 36 in FIG. 1 is not necessary. The invention also can be used to enhance the contrast at edges of characters in two-dimensional characters.

What is desired to be secured by Letters Patent is the invention as defined in the following claims.

We claim:

1. Apparatus for obtaining information from a surface, comprising:
   (a) means for scanning a light beam along a path on the surface;
   (b) means for successively sensing reflected light at a plurality of path locations within each pixel on the surface and for generating an intensity signal for each location; and
   (c) means for arranging the intensity signals successively generated for each pixel into groups and for deriving a single pixel signal from each group of intensity signals.

2. Apparatus for projecting a light beam onto a surface, comprising:
   (a) first scanning means for scanning the light beam back and forth in a first direction;
   (b) second scanning means for scanning the light beam back and forth in a second direction orthogonal to the first direction; and
   (c) third scanning means for dithering the light beam during the operation of the first scanning means.

3. Apparatus according to claim 2 in which the third scanning means moves the light beam in a circular path which translates in the first direction during the operation of the first scanning means.

4. Apparatus according to claim 2 or 3 and further comprising
   (d) sensing means for deriving a plurality of intensity signals indicative of light reflected from the surface at a plurality of points; and
   (e) processing means for grouping the intensity signals into groups to thereby define pixels within the scan generated by the first scanning means.

5. Apparatus for projecting a light beam onto a surface, comprising:
   (a) a scanning system for projecting the light beam in a generally trochoidal path;
   (b) sensing means for successively generating intensity signals indicative of the reflected light from each of a plurality of segments of the trochoidal path; and
   (c) processing means for grouping the intensity signals generated from respective segments into groups and for deriving a signal indicative of each group.

6. Apparatus for obtaining information from a surface, comprising:
   (a) a scanning system for
      (i) projecting a light beam onto the surface,
      (ii) tracing a pattern of light on the surface,
      (iii) moving the pattern to selected locations on the surface;
   (b) a sensing system for sampling the reflected light at points on the pattern and generating an intensity signal for each point in succession; and
   (c) a processing system for
      (i) grouping the successively generated intensity signals into groups; and
      (ii) deriving a single pixel signal for each group.

* * * * *